United States Patent [19]
Bockrath et al.

[11] Patent Number: 4,970,292
[45] Date of Patent: Nov. 13, 1990

[54] AMIDE-IMIDE RESIN OF LOWERED WATER ABSORPTION FOR MOLDING AND COMPOSITE APPLICATIONS

[75] Inventors: Ronald E. Bockrath; Robert B. Hanson, both of Oswego, Ill.

[73] Assignee: Amoco Corporation, Chicago, Ill.

[21] Appl. No.: 393,389

[22] Filed: Aug. 14, 1989

[51] Int. Cl.$^5$ ............... C08G 8/02; C08G 12/00; C08G 69/26
[52] U.S. Cl. .................... 528/353; 528/125; 528/126; 528/229
[58] Field of Search ............... 528/353, 125, 126, 229

[56] References Cited

U.S. PATENT DOCUMENTS 4,448,957  5/1984  Nagaoka ..................... 528/188

Primary Examiner—John Kight, III
Assistant Examiner—P. Hampton-Hightower
Attorney, Agent, or Firm—Richard J. Schlott; William H. Magidson; Ralph C. Medhurst

[57] ABSTRACT

Polyamide-imides derived from trimellitic acid compounds and an aromatic diamine are improved in moisture resistance when from 10 to about 90 mole % of the trimellitic acid compound is replaced by a biphenyl tetracarboxylic acid compound.

10 Claims, No Drawings

AMIDE-IMIDE RESIN OF LOWERED WATER ABSORPTION FOR MOLDING AND COMPOSITE APPLICATIONS

BACKGROUND OF THE INVENTION

This invention relates to improved polyamide-imide compositions, and to methods for improving the environmental resistance of polyamide-imide compositions. More particularly, this invention relates to polyamide-imide compositions that exhibit improved water absorption characteristics and resistance to the detrimental effects of humid environments. Still more particularly, the improved polyamide-imide compositions of this invention exhibit an improvement in retention of mechanical properties at elevated temperatures after exposure to humid environments.

Polyamide-imides are condensation polymers finding use in a wide range of applications such as adhesives, molding compositions, fibers, films, composites, laminates, etc., owing to a desirable combination of properties. Torlon® polyamide-imides, available from Amoco Performance Products, Inc., are examples of commercial polyamide-imides.

Despite the many desirable properties of polyamide-imides, their utility in certain applications has been limited by moisture sensitivity, leading to loss of mechanical properties on exposure to high temperatures. In addition, many such polymers, when used as molding resins, do not attain a high level of mechanical properties without additional thermal tempering or similar post treatment of the molded article. So-called annealing or post-curing treatments of polyamide-imide or polyamide-amic acid fabricated parts such as are disclosed in commonly assigned U.S. Pat. No. 4,167,620 allow water liberated due to imidization and chain extension reactions as well as absorbed moisture to diffuse out of fabricated parts and may improve retention of mechanical properties. However, since polyamide-imide resins tend to absorb water when exposed to humid environments, these treatments are not sufficient to permit the use of currently available, commercial polyamide-imides in certain demanding applications. It also is known to add certain metal oxides to polyamide-imides to tie up absorbed moisture as well as water liberated during imidization and chain extension reactions to avoid cracking and sacrifices in physical properties. Again, however, this approach does not yield sufficient improvement of presently available materials or prevent subsequent moisture absorption and further reduction in mechanical properties.

Aromatic polyimides typically do not absorb water to as great an extent as polyamide-imides. However, the utility of aromatic polyimides is limited because of their lack of solubility. Further, their high glass transition temperatures ("Tg") make melt processing impractical or impossible.

U.S. Pat. No. 4,017,459, assigned to the Upjohn Company, discloses amide-imide polymers and copolymers prepared from 2,2-bis(4-(p-aminophenoxy)phenyl) propane and trimellitic anhydride halide or from 2,2-bis(4-(p-isocyanatophenoxy)phenyl) propane and trimellitic acid or anhydride. According to the patent, such polyamide-imides are melt processable, such as by injection molding, and useful in manufacture of articles such as gears, ratchets, clutch linings, bearings, pistons and cams and electrical components. In contrast, the patentee teaches that polyamides prepared from the above-named diamine and isophthalic acid and polyimides prepared from that diamine and pyromellitic acid dianhydride or benzophenone tetracarboxylic acid dianhydride are intractable in the sense of lacking sufficient solubility for solution processing, lacking in melt processability or lacking both.

U.S. Pat. Nos. 4,111,906 and 4,203,922, both assigned to TRW, Inc., disclose that although processability of polyimides can be improved by using the same in predominantly polyamide-amic acid form and imidizing during a final fabrication step, such an approach is disadvantageous because voids in the final products result from water liberated due to the imidization reaction. These patents also state that chemical and thermal stability are improved by preparing polyimides from 2,2-bis(4-(p-aminophenoxy)phenyl) hexafluoropropane. According to the '906 patent, polyimides prepared from this diamine and a dianhydride are useful as coatings, adhesives and as a matrix for laminated glass or graphite structures. Polyimide foams prepared from pyromellitic acid dianhydride or other aromatic tetracarboxylic acid dianhydrides and such diamine in combination with a second aromatic diamine are disclosed in U.S. Pat. No. 4,535,101, assigned to Imi-Tech Corporation. Preparation of polyamides from the above-named diamine and diacids also is disclosed in the '906 patent. The abstracts of both the '906 and '922 patents mention polyamide-imides; however, no additional information is provided.

U.S. Pat. No. 4,340,697, assigned to Toray Industries, Inc., discloses melt processing difficulties with polyamide-imides and purports to remedy the same by blending with polyphenylene sulfide, polyamide, aromatic polyester, polyphenylene ether or a phenoxy resin. According to this patent, polyamide-imides may contain, in addition to a repeating, main structural amide-imide unit, up to 50 mole percent amide or imide units, the latter being introduced into the polymer by replacing a portion of the aromatic tricarboxylic acid component with pyromellitic acid dianhydride or benzophenone tetracarboxylic acid dianhydride.

U.S. Pat. No. 4,599,383, assigned to NTN-Rulon Industries Co., Ltd., discloses compositions having improved water absorption properties containing a polyamide-imide resin in combination with a polyetherimide and a fluoro resin component.

U.S. Pat. No. 4,755,585, assigned to M & T Chemicals, Inc., discloses polyimides, polyamide acids, polyamide-imides, polyesterimides and polyesteramides containing at least 10 mole percent of a reaction product of an aromatic or aliphatic mono- or dianhydride and certain aromatic diamines having an unsubstituted or halogen- or hydrocarbyl-substituted, para-phenylene radical linked by like or different alkylene, alkenylene, sulfide or oxy groups to two unsubstituted or halogen- or hydrocarbyl-substituted, monovalent, aminophenyl radicals provided that the linking groups are not contemporaneously both sulfide or oxy. Such products are said to exhibit improved processing characteristics and thermal stability and to have utility in widespread applications. Two polyamide-imides and films thereof are demonstrated in the examples. Numerous anhydrides, dianhydrides and diamines are named in this publication and mixtures of anhydrides and dianhydrides are mentioned. It is also reported that mixtures of the above-described diamines with other diamines may be used. Interestingly, such other diamines are said to include 2,2-bis(4-(p-aminophenoxy)phenyl) propane and the corresponding sulfone, although the publication also mentions, with supporting citations, that polyimides prepared from such diamines and dianhydrides are insoluble and that polyamide-imides prepared from such diamines are of uncertain solubility and processability.

As shown by the patents discussed above, a great many polyamide-imides and polyimides are known. Although a considerable effort has been expended to develop improved polyamide-imides, most of the presently available resins lack the combination of good processability and excellent as-molded properties with the reduced moisture sensitivity needed for producing composite materials for use in demanding environments. Composite materials and filled molding compounds based on such improved resins would be useful in a variety of applications, including sporting goods and under-the-hood automotive applications, as well as for producing structural components for sports equipment, automobiles, buildings and aircraft.

SUMMARY OF THE INVENTION

This invention is directed to amide-imide copolymers having improved resistance to the detrimental effects of humid environments and to a method for improving the retention of mechanical properties at elevated temperatures after exposure to humid environments for such amide-imide copolymers. More particularly, the improved amide-imide copolymers of this invention are based on conventional amide-imide copolymers derived from at least one trimellitic acid compound and one or more aromatic diamines, the improvement comprising replacing from 10 to 90 mole %, preferably from 30 to 90 mole %, of the trimellitic acid compound with one or more biphenyl tetracarboxylic acid compounds.

The improved polyamide-imide copolymers of this invention are moisture-resistant, thermally stable polymeric compositions having excellent mechanical, thermal and chemical properties and are suitable for processing by melt or solution processes. They are particularly suited for use in preparing composite structures with excellent compressive strength, and can be used as filled or unfilled molding compositions for producing high strength molded articles of manufacture, as well as for high strength binders, adhesives and coatings for various materials or substrates.

DESCRIPTION OF THE INVENTION

Briefly, the polyamide-imide compositions of this invention comprise amide-imide units and imide-imide units, including amic acid precursors thereof. The aforesaid units are derived from a mixture comprising a trimellitic acid component, a biphenyl tetracarboxylic acid component and at least one aromatic diamine, wherein the trimellitic acid component comprises at least one trimellitic acid compound, and the biphenyl tetracarboxylic acid component comprises at least one biphenyl tetracarboxylic acid compound.

The polyamide-imide compositions will thus be copolymers, and will comprise polymeric trimellitamide-imide units, including the corresponding amic acid precursor, derived from the trimellitic acid component, and polymeric biphenyl tetracarboxylic di-imide units, including the corresponding amic acid precursors, derived from the biphenyl tetracarboxylic acid component. The mole ratio of units derived from the trimellitic acid component and units derived from the biphenyl tetracarboxylic acid component will be in the range of 1:9 to about 9:1, based on the total moles of such units in the copolymer.

By the term "amic acid precursors" is meant those amic acid units corresponding to the trimellitamide-imide structure, as follows:

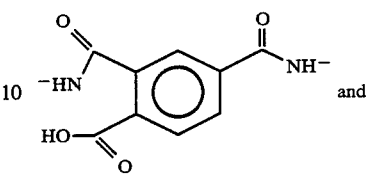

and

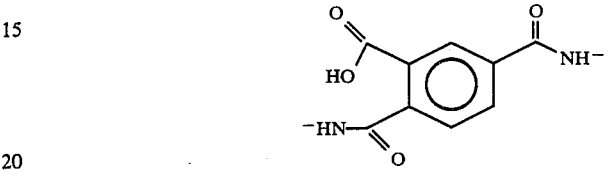

and the amic acid units corresponding to the biphenyl tetracarboxylic di-imide structure, as follows:

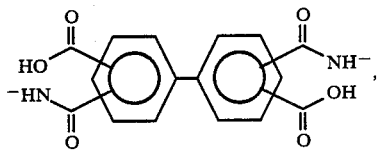

with the proviso that the carbonyl carbons of the amide group and carboxylic acid group attached to the same aromatic ring shall be attached to adjacent carbon atoms of the aromatic ring.

Referring to the formulas and the description thereof appearing hereinabove, it will be apparent that compositions according to this invention comprise units in which the combination of imide and imidizable amide linkages exceeds other amide linkages. By "imidizable amide linkages" is meant those amide linkages ortho to a carboxylic acid group, which are present in the amic acid components. Typically, during melt processing, annealing or curing treatments or other suitable heating, substantial conversion of such imidizable amide linkages to imide form occurs due to reaction of the ortho-disposed amide and carboxyl groups, such conversion resulting in an excess of imide bonds relative to amide bonds. It may be speculated that the improved hydroscopic properties of these polyamide-imides relative to conventional polyamide-imides, in which essentially equimolar levels of amide and imide linkages are present, are attributable, at least in part, to the reduced level of amide linkages together with the reduced level of total amide and imide linkages for a given molecular weight.

Such polyamide-imides can be prepared by a process comprising reacting, in a nitrogen-containing solvent, a mixture of comprising at least one trimellitic acid compound, at least one biphenyl tetracarboxylic acid compound in which each carboxyl group is ortho to one other carboxyl group, and at least one aromatic diamine, the biphenyl tetracarboxylic acid compounds comprising from about 10 to about 90, more preferably from about 30 to about 90 mole % of the total of the trimellitic acid component and biphenyl tetracarboxylic acid component of the mixture. Preferably the biphenyl tetracarboxylic acid component will comprise at least 30 mole % of said mixture. That is, the mole ratio of trimellitic acid component to biphenyl tetracarboxylic acid component will lie in the range of from 1:9 to about 9:1, preferably in the range of from 3:7 to about 9:1.

The trimellitic acid component comprises trimellitic acid, trimellitic anhydride or its dimer, a trimellitoyl anhydride halide or a combination thereof. Preferably, a combination of 4-trimellitoyl anhydride chloride with trimellitic anhydride is employed because their different reactivities with diamines permit balancing of the proportions of the anhydride and acid chloride relative to each other and to the aromatic tetracarboxylic acid component in such a manner that a high degree of control over polymer inherent viscosities and, accordingly, processability can be achieved. Thus, even in polyamide-imides according to the invention in which high levels of biphenyl tetracarboxylic acid component-derived units are present, inherent viscosities well suited for further processing can be achieved through the use of higher levels of trimellitic anhydride in the trimellitic acid component. Preferably, when using a combination of 4-trimellitoyl anhydride chloride and trimellitic anhydride, the proportion of anhydride ranges up to about 30 mole % based on total moles of trimellitic acid component and biphenyl tetracarboxylic acid component. As biphenyl tetracarboxylic acid component content increases relative to trimellitic acid component content, the proportion of trimellitic anhydride in the combination is preferably increased.

The biphenyl tetracarboxylic acid component has each carboxyl group ortho-disposed with respect to one other carboxyl group. More particularly, suitable examples include 3,3',4,4'-biphenyl tetracarboxylic acid dianhydride, and 2,2',3,3'-biphenyl tetracarboxylic dianhydride. Mixtures can be employed if desired.

The polycarboxylic acid component of the mixture may further comprise minor amounts, up to about 20 mole %, of additional polycarboxylic acid compounds.

The aromatic diamines useful in the practice of this invention will have the formula:

H₂N—Ar—NH₂ wherein Ar is a mononuclear or polynuclear aromatic radical. Ar may be further characterized as being an aromatic radical selected from the group consisting of mononuclear radicals, such as those represented by the structures

and aromatic radicals comprising a plurality of aromatic carbocyclic radicals interconnected by a carbon-carbon bond or a divalent bridging group, such as those aromatic radicals represented by the structures

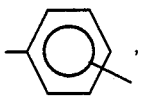

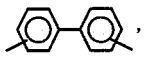

-continued

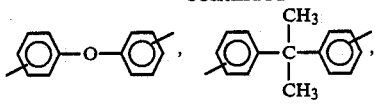

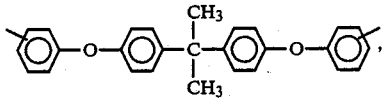

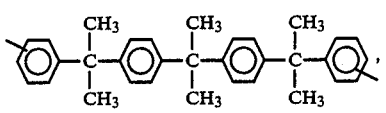

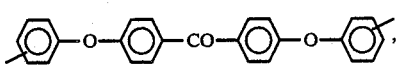

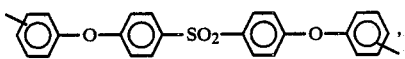

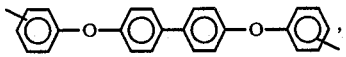

and the like, as well as mixtures thereof.

Suitable diamines include those having a single aromatic nucleus such as the various phenylene diamines, as well as aromatic diamines having a plurality of aromatic rings fused or joined through a stable linkage, including, for example, 4,4'-diaminodiphenyl sulfone, 4,4'-diaminodiphenyl ether or oxy-bis-aniline, 4,4'-bis-(aminophenyl) methane, 4,4'-diaminobenzophenone, 2,2-bis(4-(p-aminophenoxy)phenyl) propane, 2,2-bis(3,5-dichloro-4-(p-aminophenoxy)phenyl) propane, 2,2-bis(4-(p-aminophenoxy)phenyl) hexafluoropropane, 2,2-bis(4-(m-(aminophenoxy)phenyl) hexafluoropropane, 2,2-bis(4-(m-(aminophenoxy)phenyl) propane, 2,2-bis(4-aminophenoxy)biphenyl, 2,2-bis(4-p-aminophenoxy)phenyl ether, 2,2-bis(4-m-aminophenoxy) benzophenone and the like, as well as combinations thereof. Preferably, the diamines will be selected from oxy-bis-aniline, m-phenylene diamine, and mixtures thereof.

As discussed above, the molar ratio of imide plus imidizable linkages to amide linkages in the compositions according to this invention is important from the standpoint of product properties. To achieve the desired final product molar ratios, about 10 to about 90 mole % trimellitic acid component and about 90 to about 10 mole % biphenyl tetracarboxylic acid component, based on the total trimellitic acid and biphenyl tetracarboxylic acid components, are used. Preferably, these mole percentages are about 70 to about 10 and about 30 to about 90, respectively. More preferably, mole percentages of these components are selected based on intended polymer application as discussed previously.

Preferably, essentially equimolar quantities of diamine and the polycarboxylic acids or their derivatives, e.g., anhydrides, anhydride halides, esters, are employed in preparation of the polyamide-imide copolymer compositions, although an excess of either can be employed and may be useful from the standpoint cf controlling product properties such as inherent viscosity. It is contemplated to employ in preparation of the polyamide-imide compositions according to this invention minor amounts of acid or diamine components in addition to those described hereinabove to obtain polymeric compositions comprising recurring units as illustrated hereinabove together with minor amounts of other units. Examples of other acid components that can be employed include aliphatic and aromatic diacids such as adipic acid, isophthalic acid, terephthalic acid, 2,6-naphthalene dicarboxylic acid and its esters, phthalic anhydride and the like. Other suitable diamines include sulfonyl(bis-aniline), bis-aminophenoxybenzenes, bis-(aminophenoxy)phenyl sulfones, m-toluene diamine, hexamethylene diamine, trimethylhexamethylene diamine, 1,12-diaminododecane and similar diamines of the type conventionally used in preparation of polyamide-imides or polyamides. Combinations of such other acid and diamine components also may be used.

It may also be desirable to include effective amounts, e.g., up to about 10 mole % based on total acid component content, of capping agents such as aniline, phthalic acid, phthalic anhydride or similar monofunctional reagents to provide further control of polyamide-imide molecular weights. Trifunctional or higher polyfunctional reagents such as, for example, trimellitic trichloride or 1,3,5-benzene tricarboxylic acid trichloride can be employed to promote branching.

Usually, reaction of the above-described components is carried out in the presence of a nitrogen-containing, organic, polar solvent such as N-methylpyrrolidone, N,N-dimethylformamide, N,N-diamethylacetamide or combinations thereof. Reaction should be carried out under substantially anhydrous conditions and at a temperature below about 50° C. Most advantageously, the reaction is carried out at about 20° C. to about 70° C.

The reaction time is not critical and depends primarily on the reaction temperature. It can vary from about 1 to about 4 hours, with about 2 to about 4 hours at temperatures of about 30° C. to about 70° C. being preferred when using nitrogen-containing solvents.

As a result of the reaction there is obtained a relatively viscous solution comprising polyamide-imide, typically in predominantly amic acid form, in the reaction solvent. The invented compositions can be recovered from the solution by any suitable means, for example by precipitation with water, and then processed in powder form, pelletized for further processing or re-dissolved in a nitrogen-containing, organic, polar solvent for use in solution processing.

Reaction of components comprising trimellitic acid component, biphenyl tetracarboxylic acid component and diamine component according to this invention also can be conducted stepwise by reacting all or part of one of the acid components with diamine component to form an oligomeric product and subsequently reacting that product with the other acid component and any remaining acid component in one or more additional steps. Preferably, a stoichiometric excess of diamine component is used in relation to the acid component in the first step so that the oligomeric species resulting from the reaction are predominantly amine-terminated and thus capable of further reaction with additional acid component. The first step preferably is conducted in a nitrogen-containing solvent such as identified above at temperatures and for a time sufficient to attain essentially complete reaction of the first acid component with the diamine. More preferably, temperatures of about 20° C. to about 60° C. are employed during the reaction. The products of such a step can then be employed in reaction with the remaining acid component substantially as described hereinabove. When using an excess of one of the acid components relative to the other, best results are achieved when the acid component being used in lower proportion is reacted with diamine in a first step and the product thereof is reacted with the acid component being used in higher proportion in a subsequent step.

Preparation of the polyamide-imide copolymers according to this aspect of the invention allows for substantial flexibility in terms of polymer composition in that longer or shorter oligomeric species can be formed, depending on first step component proportions, and incorporated into the final polymer, thereby affording a high degree of control over polymer properties such as Tg. In addition, preparation by this technique yields products with the same end groups that are present in conventional polyamide-imides; accordingly, curing or annealing can be conducted to enhance polymer properties.

Typically, preparation of the polyamide-imide copolymers in either a single or multiple step process yields products having a substantial amic acid content, e.g., in which there is present a substantial content of structures described hereinabove as amic acid precursors. Generally, amic acid content is about 50 to about 100 mole percent based on imidizable groups. Acid titre is a convenient indicator of amic acid content, with values of about 1 to about 3 milliequivalents COOH per gram of polymer indicating a product of significant amic acid content. Conversion of amic acid groups to imide groups can be accomplished by heating, including that conducted during the polymerization or in subsequent processing operations, or chemical means to increase imide content as desired. Conveniently, heating at about 80° C. to about 250° C. is conducted for about 1 to about 20 hours to increase imide content as desired.

The above-described polyamide-imide compositions of this invention are particularly useful when blended, composited or filled with other materials such as additives, fillers, reinforcing materials, other polymeric resins and combinations thereof.

Blending with other high performance polymeric products, such as polyarylether sulfones, polyetherimides, polyamides, polyphenylene oxide and other polyarylethers, other polyamide-imides, certain polyimides and polyarylene sulfides or combinations thereof can be performed to tailor products to requirements for specific applications. Both miscible and immiscible blends are contemplated as is the use of compatibilizing agents to enhance miscibility of otherwise immiscible materials. Typically, immiscible blends contain polyamide-imide component according to the invention as a dominant polymeric resin component if it is desired that properties attributable to such component dominate blend properties. On the other hand, lesser amounts of such polyamide-imide compositions can be used to improve or modify properties of other polymers; accordingly, blends containing such other resins as a dominant component also are contemplated. Miscible blends, also referred to as alloys, comprising the invented compositions and one or more additional polymeric resin components in various proportions also can yield desirable results. Usually, blends are prepared by melt blending of the polymeric components although dry blending and solution blending can also be conducted in lieu of or to facilitate melt blending. Preferably, due to the high viscosity of the invented compositions at temperatures employed in melt blending, a high shear mixer such as a twin-screw extruder is employed for melt blending.

Filled compositions comprising particulate or fibrous fillers or reinforcing materials embedded in the polyamide-imide copolymer matrix resin are also contemplated. Particulate fillers in the form of fiber, beads, flakes, fibrils, whiskers and the like will be suitable, including glass beads, graphite powder, various mineral fillers such as talc, wollastonite and pumice, resin beads and powdered resins. Suitable fibrous fillers or reinforcing materials include glass, carbon, graphite, boron, aramid and other fibers. Compositions intended for use in injection molding applications preferably contain up to about 40 weight percent particulate or fibrous materials or a combination thereof because at higher levels the high melt viscosity of the invented polymers together with the viscosity-increasing effect of fibers and particulates make processing difficult. Higher filler levels, e.g., up to about 60 weight percent, are suitable for molding compounds for compression molding, e.g., chopped fiber molding compositions. Filler levels can be increased through use of suitable flow-improvers or processing aids. For injection molding compositions, preferred glass fibers are those made of alkali-free, boron-silicate glass (E-glass) or alkali-containing C-glass, average diameter of the fibers preferably being between about 3 and about 30 microns. It is possible to use both long fibers with an average length of from 5 to 50 millimeters. In principle, any standard commercial-grade fibers can be used.

Composites and prepreg comprising up to 60 wt % continuous fiber may be formed of woven or nonwoven fabric or unidirectional tape or ribbon comprising continuous fibers. Preferably, such fibers have a modulus of at least 8,000,000 psi and are thermally stable to at least 500° F. (260° C.) for at least about ten minutes in order to obtain composites of high strength, the fibers of which resist degradation at temperatures employed in processing, e.g., by compression molding. The term "thermally stable" means the fiber does not emit volatiles to such an extent as to cause voids in the final composite structure. Such thermally stable fibers as silicon nitride, silicon carbide and other ceramic fibers, glass, alumina, boron, Kevlar, graphite, quartz, and carbon fibers are useful as are combinations thereof. Carbon fibers, including graphite fibers, are especially preferred.

For purposes hereof, carbon fibers include graphite fibers as well as amorphous carbon fibers which result after a thermal carbonization or graphitization treatment Graphite fibers consist substantially of carbon and have a predominant X-ray diffraction pattern characteristic of graphite. Amorphous carbon fibers, on the other hand, are fibers in which the bulk of the fiber weight can be attributed to carbon and which exhibit a predominantly amorphous X-ray diffraction pattern. Graphite fibers generally have a higher Young's modulus than do amorphous carbon fibers and in addition are more highly electrically and thermally conductive. A variety of suitable carbon fibers are readily available from commercial sources, including, for example, THORNEL® P-50, P-75, P-100 and P-120 grades of pitch based carbon fiber, as well as T-300, T-500 and T-650/42 grades of polyacrylonitrile-derived carbon fibers available from Amoco Performance Products, Inc.

The improved moisture resistance of the polyamide-imides of this invention imparts particularly beneficial property improvements to fiber-filled composites based thereon. More particularly, the polyamide-imide compositions of this invention provide unexpected improvements in the hot, wet properties of such composites, increasing the acceptability of such composites for use under particularly stringent environmental conditions.

The practice of this invention will be better understood through consideration of the following examples, which are offered by way of illustration, and not in limitation thereof. The methods of the following Examples are representative of those that may be employed for preparing the resin formulations useful in the practice of this invention, as well as prepreg and composites based thereon, as will be generally recognized by those skilled in the art.

EXAMPLES

EXAMPLE 1

A clean dry four-neck round bottom flask equipped with stirrer and fitted with a nitrogen purge assembly was charged with 1 liter of dry N-methyl pyrrolidone (<500 PPM water). To this solvent 140.2 grams (0.70 moles) of oxybis(aniline) (OBA) and 32.4 grams (0.30 moles) of m-phenylenediamine (MPDA) were added and stirred at room temperature (22° C.) until dissolved. A mixture of 88.3 grams (0.30 moles) of biphenyl dianhydride (BPDA) and 10.6 grams (0.055 moles) of trimellitic anhydride (TMA) was then added to the solution over 70 minutes. The mixture was stirred an additional 40 minutes to completely dissolve the monomers; the temperature at the end of that time was 25° C.

To this clear solution were added 135.8 grams (0.645 moles) of solid 4-trimellitoyl chloride (4-TMAC) over 70 minutes.

The temperature increased further to 30° C. The mixture was then stirred another two hours, reaching a viscosity of about 15 poises. The reaction solution was then precipitated by pouring on an excess of distilled water in a Waring blender over a 20 minute period. The solid polymer was recovered by filtration, then dispersed in distilled water, allowed to soak overnight, then collected by filtration. This procedure was repeated eight times with soak times of at least one hour. The filtered polymer was air-dried overnight, then dried in a vacuum oven at 60° C. for approximately 50 hours.

The dried polymer had solids content of 89.8 wt % (determined by heating 1.0 gram of polymer 20 minutes at 260° C.), and an inherent viscosity of 0.32 dl/g, in NMP (0.5%, 25° C.), and an acid titre of 3.64 meq/g.

A sample of dried polymer, cured by heating two hours at 260° C., was compression molded at 343° C. for determination of mechanical properties. The compression molding was done with a press using a circular cavity mold of 5⅞" diameter and 2000 psig pressure applied at 665° F. The part was cooled in the mold and removed from the mold at 250° F.

EXAMPLE 2

A three-necked 2 liter reaction flask equipped with a stirrer was used to prepare a polymer of 4-TMAC/TMA/BPDA--OBA/MPDA (60/10/30--70/30) The OBA 140 grams (0.7 moles) and MPDA 32.4 grams (0.3 moles) were weighed into the flask. To the flask was added 250 grams of NMP which had been dried over molecular sieves. The flask was warmed to 122° F. and a slurry of BPDA 88.3 grams (0.30 moles) in 120 grams of dried NMP was added slowly to the flask. Stirring was continued overnight. In the morning the BPDA had reacted with the diamines.

A solution of TMA 19.2 grams (0.10 moles) was dissolved in 100 grams of NMP and added to the flask. A solution of 4-TMAC 126.3 grams (0.60 moles) in 250 grams of NMP was added to the flask keeping the flask between 90° and 100° F. with cooling water. The reaction solution was warmed to 122° F. for about 45 minutes and the polymer precipitated in a Waring blender with deionized water. The polymer was washed with deionized water as in Example 1.

EXAMPLES 3-5

Additional Examples were prepared substantially by following the procedures of Examples 1 and 2.

Example A (Control)

An amide-imide polymer was prepared substantially by the processes of Example 1, but omitting the biphenyl dicarboxylic anhydride component.

Specimens of the Examples and Control Example were prepared for testing by molding 6" disks in a Wabash molding press at a temperature of 700° F. and a pressure of about 3,500 psi. After cooling to about 250° F., the disks were removed from the mold, cooled further, and cut into specimens for testing. Tensile properties were determined following the procedures of ASTM D-638, while moisture takeup was determined be immersing specimens in water at 160° F. to constant weight gain.

The compositions and the properties of the molded polymers are summarized in Table I.

TABLE I

| Ex. No. | 4-TMAC m % | TMA m % | BPDA m % | T.Str. Kpsi | E % | T.Mod Kpsi | H₂O wt % |
|---|---|---|---|---|---|---|---|
| 1 | 64.5 | 5.5 | 30.0 | 17.5 | 4.5 | 536 | (3.4) |
| 2 | 60.0 | 10.0 | 30.0 | 15.3 | 4.3 | 534 | 3.8 |
| 3 | 34.5 | 5.5 | 60.0 | 14.3 | 3.7 | 537 | 3.0 |
| 4 | 30.0 | 10.0 | 60.0 | 13.0 | 3.1 | 529 | 3.1 |
| 5 | 0 | 10.0 | 90.0 | 20.1 | 8.1 | 542 | 2.6 |
| Control Examples | | | | | | | |
| A | 94.5 | 5.5 | 0 | 7.7 | 1.6 | 547 | 4.5 |

Notes:
Poly(amide - imide) compositions based on substantially equimolar amounts of diamine and polycarboxylic components, using a 7/3 mole ratio of oxybis(aniline) to m-phenylene diamine as the diamine component, as described in the Examples; 4-TMAC = 4-trimellitoyl anhydride chloride; TMA = trimellitic anhydride; BPDA = 3,3',4,4'-biphenyl tetracarboxylic acid dianhydride; Properties for compression-molded specimens, as molded; T.Str. = Tensile Strength, T.Mod = Tensile Modulus, H₂O = weight gain, see text for procedures.

In the foregoing Examples 1-5 and the Control Example A, the mechanical properties were determined for as-molded samples, without further heat treatment. Those familiar with high temperature molding resins will recognize that subjecting such resins to further heating in a post-curing operation has been heretofore regarded as desirable in order to attain maximum mechanical properties, and particularly tensile properties. The resin of Control Example A, when subjected to a post-curing operation may attain values of as much as 21 kpsi for tensile strength and 8% for elongation or more. It will be seen from the data presented in Table I for Examples 1-5 that the improved compositions of this invention can attain as-molded mechanical properties that are substantially better than the as-molded properties of the prior art Control A resin; in most circumstances, however, a post-curing operation will further benefit the mechanical properties of such compositions.

It will also be apparent from a consideration of the property data for the Examples set forth in Table I that the incorporation of biphenyl tetracarboxylic anhydride (BPDA) into a polyamide-imide based on trimellitic acid compounds markedly reduces the tendency of such amide-imide resins to absorb moisture. Although the degree of improvement in moisture resistance produced by a particular level of BPDA will be seen to exhibit slight variation depending in part upon the level of trimellitic acid employed, all such resins are substantially improved. However, the incorporation of the biphenyl tetracarboxylic acid component to achieve improved moisture resistance is not detrimental to mechanical properties, and particularly to properties such as modulus that are important for use in composite applications.

An alternative to the use of TMA for attaining control of molecular weight is the use of a monofunctional agent such as an aromatic diamine or the like, and this method will be preferred where long term melt stability is desired. Compositions equivalent with those of Examples 1 and 2, when prepared using a 70/30 ratio of 4-TMAC to BPDA, together with a mixture of amines comprising a 7/3 ratio of oxybis(aniline) to m-phenylene diamine and varying amounts of aniline, exhibit substantially equivalent mechanical properties and moisture resistance upon molding.

EXAMPLE 6

The procedure of Example 2 was substantially followed to provide additional quantities of the 60/10/30 resin for preparing composite specimens. Test laminates were prepared by dissolving the resin in N-methyl pyrrolidone at a solids level of about 50 wt % and casting film. The film was used to prepare prepreg by sandwiching a Thornel T650/42 12K unitape between two films and passing the structure through a prepreg machine to apply heat and pressure, impregnating the tape and providing a prepreg. The tapes, after drying in an oven to 8% volatiles content, were then laid up and molded in an autoclave using 185 psi.

The laminates, as molded, contained less than 1% solvent and typically had a dry glass transition temperature (Tg) of 268° C. (515° F.) as measured by DSC or by DMA (loss modulus). After saturation with water, laminates typically had a wet Tg of 215° C. (420° F.) as measured by DMA, with a transition in flexural modulus at 200° C. (390° F.).

The properties of the laminates, together with a control laminate prepared in the same manner using the polymer of Example A, are presented in the following Table II. The Open Hole Compression Strength was determined using 1 in. ×3 in. coupons cut from 24 ply laminate test panels. The test coupons had a ¼ hole drilled in the center. The specimen was placed in an Instron Tester, using a fixture with a ½ in. unsupported area around the hole. The specimen was then end-loaded to failure, and the load-to-failure recorded. Dry specimens were tested as received, while the moisture conditioned specimens were immersed in water at 160° F. to 75-80% of weight gains at saturation for 100% humidity before testing.

TABLE II

| COMPOSITE PROPERTIES | | |
|---|---|---|
| | Ex. A | Ex. 6 |
| 0° Laminate, 8 plys | | |
| 0° Compression Strength, (Kpsi) | 203 | 230 |
| Short Beam Shear Strength, (Kpsi) | 16.6 | 17.0 |
| (45°/0°/−45°/90°) Laminate, 24 plies | | |

TABLE II-continued

| COMPOSITE PROPERTIES | | |
|---|---|---|
| | Ex. A | Ex. 6 |
| Open Hole Compression Strength, | | |
| Dry, (Kpsi) | 48.1 | 48.0 |
| 350° F. Wet, (Kpsi) | 22.3 | 32.0 |

The improvement in mechanical properties, and particularly in retention of mechanical properties after exposure to moisture and heat, for composites based on the polyamide-imides of this invention will be apparent from a comparison of the test results presented for the composites of Control Example A and Example 6.

Additional compositions were prepared for comparison purposes following generally the processes of Examples 1 and 2, but using other dianhydrides in place of biphenyl tetracarboxylic acid dianhydride. A fiber-reinforced resin prepared with 50 mole % benzophenone tetracarboxylic dianhydride was not thermally processable, apparently due to cross-linking, while a similar resin made with diphenyl ether tetracarboxylic acid dianhydride (oxybisphthalic dianhydride) had a substantially reduced modulus value compared with that of the polyamide-imide homopolymer. Resins comprising pyromellitic acid dianhydride also exhibit a lowered modulus and, due to a significant increase in resin melt temperature, are substantially more difficult to thermally process. It will thus be apparent that biphenyl tetracarboxylic acid compounds are uniquely suited among the commonly available aromatic tetracarboxylic acid compounds for use in the practice of this invention.

The invention will thus be seen to be improved polyamide-imide compositions which may be derived from a mixture of polycarboxylic acid compounds comprising at least one trimellitic acid compound and at least one biphenyl tetracarboxylic acid compound, and aromatic diamines having the formula $H_2N-Ar-NH_2$, wherein Ar is a mononuclear or polynuclear aromatic radical. The moisture resistance of the polyamide-imide will be substantially improved by the incorporation of from about 10 to about 90 mole % of the biphenyl tetracarboxylic acid component, and the improved polyamide-imides of this invention will be thus useful in the production of laminates and composite materials for applications requiring good retention of mechanical properties at elevated temperatures after exposure to humid environments. The compositions of this invention have been set forth and characterized by the way of examples which are provided by way of illustration and not in limitation. The polyamide-imide resins of this invention may further include one or more of the variety of stabilizers, fillers, dyes, pigments, plasticizers, processing aids and the like commonly employed in the art for such compositions, as will be recognized by those skilled in the art. Such additions and modifications will therefore be considered as being within the scope of the invention, which is defined by the appended claims.

We claim:

1. A polyamide-imide copolymer comprising amide-imide units and imide-imide units, said units derived from trimellitic acid compounds and biphenyl tetracarboxylic acid compounds in a mole ratio of from about 3:7 to about 9:1, and at least one aromatic diamine.

2. The copolymer of claim 1 wherein said aromatic diamine has the structure $H_2N-Ar-NH_2$, wherein Ar is an aromatic carbocyclic radical selected from the group consisting of mononuclear aromatic radicals and polynuclear aromatic radicals.

3. The copolymer of claim 1 wherein said aromatic diamine has the structure $H_2N-Ar-NH_2$, wherein Ar is an aromatic radical selected from the group consisting of mononuclear radicals and polynuclear aromatic radicals having a plurality of aromatic carbocyclic radicals interconnected by a carbon-carbon bond or a divalent bridging group.

4. The copolymer of claim 3 wherein said aromatic radical is an aromatic radical represented by the structure

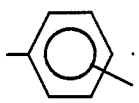

5. The copolymer of claim 3 wherein said polynuclear aromatic radical is an aromatic radical selected from the group consisting of aromatic radicals represented by the structures

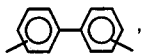

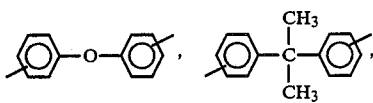

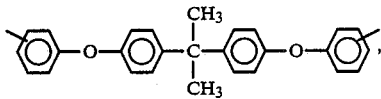

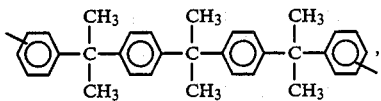

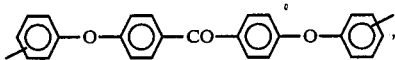

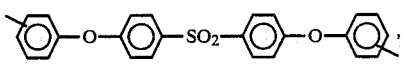

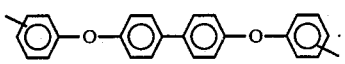

6. The copolymer of claim 1 wherein said diamine is selected from the group consisting of m-phenylenediamine, p-phenylenediamine, diaminodiphenyl sulfone, oxy-bis-aniline, 4,4'-bis(aminophenyl) methane, 2,2-bis(4-(p-aminophenoxy)phenyl) propane, 2,2-bis(3,5-dichloro-4-(p-aminophenoxy)phenyl) propane, 2,2-bis(4-(p-aminophenoxy)phenyl) hexafluoropropane, 2,2-bis(4-(p-aminophenoxy)phenyl) hexafluoropropane, 2,2-bis(4-(m-aminophenoxy)phenyl) propane, 2,2-bis(4-aminophenoxy) biphenyl and 2,2-bis(4-p-aminophenoxy) phenyl ether.

7. The copolymer of claim 1 wherein said diamine is selected from the group consisting of oxy-bis-aniline and m-phenylene diamine.

8. A polyamide-imide copolymer comprising amide-imide units and imide-imide units, said units derived from
- (i) at least one trimellitic acid compound selected from the group consisting of trimellitic acid anhydride, and 4-trimellitoyl anhydride chloride;
- (ii) 3,3',4,4'-biphenyl tetracarboxylic acid dianhydride; and
- (iii) at least one aromatic diamine selected from the group consisting of oxy-bis-aniline and m-phenylene diamine;

the mole ratio of said trimellitic acid compound and said biphenyl tetracarboxylic acid dianhydride being in the range of from about 3:7 to about 9:1.

9. A method for improving the moisture resistance of a polyamide-imide comprising amide-imide units derived from a trimellitic acid compound and an aromatic diamine, said method comprising the step of replacing from about 30 to about 90 mole % of the trimellitic acid compound with a biphenyl tetracarboxylic acid compound.

10. The method of claim 9 wherein said biphenyl tetracarboxylic compound is 3,3',4,4'-biphenyl tetracarboxylic acid dianhydride.

* * * * *